United States Patent [19] [11] 4,065,611
Miyoshi et al. [45] Dec. 27, 1977

[54] PROCESS FOR THE PRODUCTION OF POLYOLEFINS

[75] Inventors: Mituji Miyoshi, Kanagawa; Kazuo Matsuura, Kawasaki; Nobuyuki Kuroda; Shiro Ogawa, both of Yokohama, all of Japan

[73] Assignee: Nippon Oil Company Limited, Tokyo, Japan

[21] Appl. No.: 722,859

[22] Filed: Sept. 10, 1976

Related U.S. Application Data

[63] Continuation of Ser. No. 377,056, July 6, 1973, abandoned.

[30] Foreign Application Priority Data

July 8, 1972 Japan .................................. 47-67907

[51] Int. Cl.$^2$ ........................... C08F 4/02; C08F 10/02
[52] U.S. Cl. ................................. 526/124; 252/429 C; 526/125; 526/352
[58] Field of Search ................. 526/124, 125, 98, 121, 526/129, 156

[56] References Cited

U.S. PATENT DOCUMENTS

| | | | |
|---|---|---|---|
| 3,513,150 | 5/1970 | Matsuura et al. | 526/156 |
| 3,658,722 | 4/1972 | Delbouille et al. | 526/124 |
| 3,663,660 | 5/1972 | Dilbouille et al. | 526/124 |
| 3,676,415 | 7/1972 | Diedrich et al. | 526/124 |
| 3,888,789 | 6/1975 | Dombro et al. | 526/124 |

FOREIGN PATENT DOCUMENTS 7,113,010  4/1972  Netherlands.

*Primary Examiner*—Edward J. Smith
*Attorney, Agent, or Firm*—Frank J. Jordan

[57] ABSTRACT

Processes for the production of polyolefins are disclosed in which olefins are polymerized in the presence of Ziegler catalyst components carried on magnesium oxide. The polymerization is effected in the presence of a solid catalyst comprising a transition metal halide carried on magnesium oxide, such oxide having been pretreated with an organic halide, and another catalyst component selected from the group consisting of organoaluminum compounds and alkylzinc. The combination of these catalysts contributes to increased polymer yields based on both carrier and transition metal.

13 Claims, No Drawings

PROCESS FOR THE PRODUCTION OF POLYOLEFINS

This is a continuation of application Ser. No. 377,056, filed July 6, 1973, now abandoned.

BACKGROUND OF THE INVENTION

This invention relates to the polymerization of olefins and more particularly to catalysts used therefor.

The invention has for its primary object to provide an improved process for polymerizing various olefins in the presence of a composite catalyst comprising transition metal halides constituting the Ziegler catalyst effectively carried on magnesium oxide through the medium of organic halides and organoaluminum compounds or alkylzinc whereby polymer yields based on both carrier and transition metal are notably increased with ash contents in the polymer held to an absolute minimum, thus eliminating the necessity of separate steps for the removal of residual catalysts.

In polymerization processes of this character, attempts have been made to provide enhanced polymer yields by the use of titanium tetrachloride carried on magnesium oxide as disclosed in Belgian Pat. No. 705,220, or by the use of titanium tetrachloride carried on magnesium oxide which has been treated with halogenating agents such as hydrogen chloride, trichlorophosphorus monoxide ($POCl_3$) and dichlorocarbon monoxide ($COCl_2$) as shown by Japanese Patent Publication No. 47-14084. The use of such halogenating agents involves complicated handling and invites considerable corrosion of the equipment. Another disadvantage of these prior art processes is that while the yield of polymer based on the transition metal is sufficient, that based on the carrier is not satisfactory.

It has now been discovered that the use of certain organic halides (characteristically different from the above halogenating agents), when admixed with magnesium oxide and transition metal halides and heated together at prescribed temperatures, will contribute to increased activity of the polymerization of olefins when carried out in the presence of an organometal compound, with a remarkable increase in polymer yield based on both carrier and transition metal and further with greater bulk density of the resulting polymer. It has also been found that the polymerization process according to the invention will provide better activity particularly based on the carrier and less residual ash in the polymer than obtainable by the aforesaid prior art processes.

SUMMARY OF THE INVENTION

According to one feature of the invention, the polymerization of olefins takes place in the presence of a solid catalyst resulting from contacting a transition metal halide with magnesium oxide pretreated with an organic halide and another catalyst component comprising an organoaluminum or an alkylzinc compound preferably together with hydrogen, whereby the catalytic performance; that is, the yield of polymer based on both transition metal and carrier is considerably improved plus the fact that the necessity of added procedures for the removal of catalyst residues is obviated. Another feature of the invention is that magnesium oxide is effectively treated with hydrocarbon halides which can be handled with ease as compared to the cited halogenating agents. A further feature of the invention is found in the use of such organic halides which are capable of treating magnesium oxide having different iodine adsorption values. By the term iodine adsorption is meant the amount of iodine (mg.) adsorbed per gram of magnesium oxide which represents the activity thereof. While it is not certain as to what specific quality of the magnesium oxide is measured by the iodine adsorption, it has now been found that the amount of titanium that can be carried on magnesium oxide which has not been treated with organic halides is somewhat related to the iodine adsorption of the magnesium oxide. It has been further found that the amount of titanium to be carried on magnesium oxide having a relatively low iodine adsorption can be regulated by controlling the conditions of treating the oxide with organic halides.

These and other features of the invention will be more apparent from the following detailed description of the nature of the invention and its working examples.

The magnesium oxide used in carrying out the invention may be any of those currently available on the market, and its particle size, though not limited, is preferably not greater than 100 microns from the points of view of reactivity and dispersability in solvents. The iodine adsorption is variable with the manner in which the magnesium oxide is manufactured but imposes no restriction on the magnesium oxide which can be applied in accordance with the invention.

The solid catalysts according to the invention are prepared by thermally treating admixtures of organic halides, magnesium oxide and transition metal halides. When heating these admixtures, there may be used solvents inert to Ziegler catalysts. Typical solvents for this purpose comprise paraffinic and naphthenic hydrocarbons such as pentane, hexane, heptane and cyclohexane. But, the reaction is normally conducted in the absence of solvents at temperatures ranging between 50° C and 200° C, preferably between 100° C and 150° C. Time length for the reaction is not particularly critical and may be usually 5 minutes or longer, say up to 10 hours. The reaction must, needless to mention, be carried out in an inert gas atmosphere free of oxygen and moisture. In the preparation of the solid catalysts according to the invention, the starting magnesium oxide may be contacted with an organic halide preferably at 0° – 200° C, thereafter admixed with a transition metal halide and heated at 50° – 200° C. This may be done in the presence of solvents inert to Ziegler catalysts. The temperature at which the magnesium oxide is treated with the organic halide should more preferably be in the range of 0° C to the boiling point of the specific organic halide used. The magnesium oxide thus pretreated is then admixed with transition metal halides and treated at the temperature and time ranges that have been advanced. There is no particular limitation on the amounts of organic halides to be used. However, where the pretreatment is effected in the presence of solvents inert to Ziegler catalysts, the organic halides may be sufficient at 10 millimols or less per gram of magnesium oxide, preferably 0.1 to 5 millimols per gram of the latter. The transition metal halides are used in amounts of 0.1 to 50 times by weight of the magnesium oxide. Excess metal halides after treatment should be preferably removed with solvents. Unreacted transition metal halides may be removed for instance with the use of solvents inert to Ziegler catalysts, which solvents may be evaporated at reduced pressure to leave solid particles in the usual manner.

The polymerization of olefins according to the invention is carried out in very much the same way as it is done in the presence of Ziegler catalysts where the reaction takes place in an atmosphere substantially free of oxygen and water. It is carried out at a temperature of 20° to 200° C, preferably 50° to 180° C and at a pressure of normal to 70kg/cm², preferably 2 to 60kg/cm². Molecular weights of the resulting polymers may be regulated to some extent by varying the polymerization temperature as well as the quantities of catalysts but can be more effectively regulated by the addition of hydrogen in the polymerization admixture.

The process of the invention may be applied to all olefins polymerizable with use of Ziegler catalysts and more specifically to the polymerization of alpha-olefins such as ethylene, propylene, butene-1 and 1-hexene and to the copolymerization of ethylene and propylene, ethylene and 1-butene, and propylene and 1-butene, with satisfactory results.

The term organic halides within the meaning of the invention includes paraffinic, olefinic, aromatic and naphthenic hydrocarbons each partly substituted with halogen, available in the form of mono-substituted, di-substituted and tri-substituted compounds. The halogen herein may be fluorine, chlorine, bromine or iodine the halide being preferably liquid or gaseous at the conditions employed in accordance with the invention. Typical examples are halides of aliphatic hydrocarbons such as methylene chloride, ethylchloride, normal butylchloride, normal butylbromide, secondary butylchloride, tertiary butylchloride, tertiary butylbromide, secondary amylchloride and tertiary amylchloride, and aromatic halides such as phenylchloride and o-dichlorobenzene. Other organic halides applied in the practice of the invention include benzylchloride, allylchloride, vinylchloride, 1,1-dichloroethylene and 1,1,2-trichloroethylene. More preferred organic halides have tertiary carbons to which halogen is attached, for example such as tertiary butylchloride, tertiary amylchloride and tertiary hexylchloride.

The term transition metal halides means titanium and vanadium halides which assume a liquid phase under treatment conditions according to the invention. Typical examples are titanium (IV) halides such as titanium tetrachloride, titanium tetrabromide, ethoxy trichlorotitanium, diethoxy dichlorotitanium and dibutoxy dichlorotitanium, and vanadium (IV) halides such as vanadium tetrachloride and vanadium (V) halides such as oxytrichlorovanadium, of which titanium tetrachloride is preferred.

The organometal compounds according to the invention include organoaluminum compounds which may be represented by the general formulae:

$R_3Al$, $R_2AlX$, $RAlX_2$, $R_2AlOR$, $RAl(OR)X$ and $R_3Al_2X_3$ where R is an alkyl or aryl group and X is a halogen atom, typical examples of which organoaluminum compounds are triethylaluminum, triisobutylaluminum and diethylaluminum chloride; and organozinc compounds which may be represented by the general formula:

$R_2Zn$ where R is an alkyl group, one example of which organozinc compounds is diethyl zinc. These organometal compounds are used in amounts of 0.1 to 100 mol times the transition metal halides in the practice of the invention.

DESCRIPTION OF THE PREFERRED EMBODIMENTS

The following examples are provided for a better understanding of the invention but are not intended to impose limitations on the invention.

INVENTIVE EXAMPLE I a. Preparation of the Catalyst 10 grams of magnesium oxide having an iodine adsorption of 18 mg/gMgO were vacuum-dried at 150° C for 1 hour, followed by the addition of 50 milliliters of hexane to suspend the magnesium oxide therein. The admixture was then mixed with 40 millimols of tertiary butylchloride and stirred under reflux of hexane for 2 hours. Upon completion of the reaction, the hexane and unreacted tertiary butylchloride were removed in vacuum. 50 milliliters of titanium tetrachloride were added, and the reaction was continued for 1 hour at 130° C. The admixture was thereafter washed with hexane until titanium tetrachloride was no longer found in the wash liquid. The resulting solid compound was dried and analyzed to show the presence of 17 milligrams of titanium carried on 1 gram of the magnesium oxide.

b. Polymerization

To a nitrogen-purged, 2-liter stainless steel autoclave equipped with a stirrer were charged 1,000 milliliters hexane, 6 millimols triethyl aluminum and 1.503 grams of the aforementioned catalyst. The whole was stirred and heated to a temperature of 90° C. The admixture, which normally has a pressure of 2 kg/cm²G by hexane vapor pressure, was charged with hydrogen to a total pressure of 6 kg/cm²G and then with ethylene to a total pressure of 10 kg/cm²G. The polymerization reaction was thus started and continued for 1 hour, ethylene being charged continuously to make a total pressure of 10 kg/cm²G. Upon completion of the reaction, the resulting polymeric slurry was taken into a beaker with hexane removed at reduced pressure. There was obtained 203 grams white polyethylene having a melt index of 0.85.

INVENTIVE EXAMPLE II

The procedure of Example I above was followed for the preparation of the catalyst with the exception that the carrier was magnesium oxide having an iodine adsorption of 34 mg/gMgO There was obtained a solid catalyst carrying 62 milligrams titanium per gram of solid. The polymerization reaction was conducted substantially in the same manner as in Example I except that 420 milligrams of solid catalyst were used and the reaction was continued for 0.5 hour. There was obtained 171 grams white polyethylene of 3.5 melt index.

INVENTIVE EXAMPLE III

The procedure of Example I was followed in preparing the catalyst with the exception that magnesium oxide having an iodine adsorption of 177 mg/gMgO was used. The resulting solid catalyst consisted of 128 milligrams titanium carried on 1 gram of solid. Example I was also followed for the polymerization of ethylene except that the amount of the solid catalyst used was 520 milligrams and the reaction was continued for 0.5 hour. There was obtained 303 grams white polyethylene having a melt index of 2.76 and a bulk density of 0.350. Excellent, well balanced polymerization activity was noted with yields of 2,270 grams polyethylene per gram titanium per hour per ethylene pressure and 290 grams polyethylene per gram carrier per hour per ethylene pressure.

Inventive Examples I – III with those of Comparative Examples 1 – 3, respectively.

Table 1

| | Iodine Adsorption of Magnesium Oxide (mg/gMgO) | Tertiary Butyl-chloride | Titanium carried (mg/gMgO) | Solid Catalyst (mg) | Polymerization Time (hr.) | Yield (g) | Catalyst Activity | | Melt Index | Bulk Density |
|---|---|---|---|---|---|---|---|---|---|---|
| | | | | | | | gram polyethylene per gram titanium per hr. per $C_2H_4$ pressure | gram polyethylene per gram carrier per hr. per $C_2H_4$ pressure | | |
| Comparative Example 1 | 18 | no | 2 | 480 | 2.5 | 13 | 1,200 | 3 | 0.22 | 0.25 |
| Inventive Example I | 18 | yes | 17 | 1,503 | 1.0 | 203 | 1,980 | 33.6 | 0.85 | 0.31 |
| Comparative Example 2 | 34 | no | 10 | 705 | 1.5 | 144 | 3,130 | 32 | 3.2 | 0.30 |
| Inventive Example II | 34 | yes | 62 | 420 | 0.5 | 171 | 3,300 | 203 | 3.5 | 0.32 |
| Comparative Example 3 | 177 | no | 99 | 333 | 2.0 | 185 | 660 | 69 | 1.6 | 0.25 |
| Inventive Example III | 177 | yes | 128 | 520 | 0.5 | 303 | 2,270 | 290 | 2.76 | 0.35 |

COMPARATIVE EXAMPLE 1

The procedure of catalyst preparation as in Inventive Example I was followed with the exception that tertiary butylchloride was not added. The catalyst consisted of 2 milligrams of titanium carried per gram of solid. The polymerization reaction was conducted with use of 480 milligrams of this solid catalyst in accordance with the procedure of Inventive Example I and was continued for 2.5 hours. There was obtained 13 grams polyethylene having a melt index of 0.22 and a bulk density of 0.25.

COMPARATIVE EXAMPLE 2

The procedure of Inventive Example I was followed in preparing the catalyst with the exception that magnesium oxide having an iodine adsorption of 34 mg/gMgO was used and that tertiary butylchloride was not added. The catalyst consisted of 10 milligrams of titanium carried per gram of solid. 705 milligrams of this solid were used in the polymerization of ethylene which was conducted for 1.5 hours according to the procedure of Inventive Example I. There was obtained 144 grams polyethylene having a melt index of 3.2 and a bulk density of 0.30.

COMPARATIVE EXAMPLE 3

The procedure of Inventive Example I was followed in preparing the catalyst with the exception that magnesium oxide having an iodine adsorption of 177 mg/gMgO was used and that tertiary butylchloride was not added. The catalyst consisted of 99 milligrams of titanium carried per gram of solid. With the use of 333 milligrams of this solid catalyst, the polymerization of ethylene was conducted for 2 hours in accordance with the procedure of Inventive Example I. There was obtained 185 grams white polyethylene having a melt index of 1.6 and a bulk density of 0.28. Polymerization activities were 660 grams polyethylene per gram titanium per hour per ethylene pressure and 69 grams polyethylene per gram carrier per hour per ethylene. This clearly indicates that the catalyst activity in this Example is far much lower than the obtainable in Inventive Example III where tertiary butylchloride was used. Table 1 below is provided to compare the results of Both the catalyst preparation and polymerization procedures employed in the following additional Examples IV through XII inclusive are substantially the same as in Inventive Example I, with the exceptions particularly noted.

INVENTIVE EXAMPLE IV a. Catalyst Preparation
Carrier: Magnesium oxide having an iodine adsorption of 177 mg/gMgO.
Organic halide: Tertiary butylbromide
Catalyst: 87 milligrams titanium carried per gram solid
b. Polymerization
Solid catalyst: 582 milligrams
Polymerization time: 0.5 hour
Yield: 273 grams white polyethylene, melt index 3.1 and bulk density 0.32

INVENTIVE EXAMPLE V a. Catalyst Preparation
Organic halide: Dichloromethane
Catalyst: 5.2 milligrams titanium carried per gram solid
b. Polymerization
Solid catalyst: 466 milligrams
Polymerization time: 1.5 hours
Yield: 73 grams white polyethylene, melt index 2.1

INVENTIVE EXAMPLE VI a. Catalyst Preparation
Organic halide: Benzylchloride
Catalyst: 7.2 milligrams titanium carried per gram solid
b. Polymerization
Solid catalyst: 504 milligrams
Polymerization time: 1 hour
Yield: 140 grams white polyethylene, melt index 1.8 and bulk density 0.29

INVENTIVE EXAMPLE VII a. Catalyst Preparation
Organic halide: Phenylchloride
Catalyst: 6.1 milligrams titanium carried per gram solid
b. Polymerization
Solid catalyst: 423 milligrams
Polymerization time: 1 hour Yield: 126 grams white polyethylene, melt index 1.9 and bulk density 0.30

INVENTIVE EXAMPLE VIII a. Catalyst Preparation
Organic halide: Tertiary amylchloride
Catalyst: 26.8 milligrams titanium carried per gram solid
b. Polymerization
Solid catalyst: 502 milligrams
Polymerization time: 0.5 hour
Yield: 76.5 grams white polyethylene, melt index 2.6 and bulk density 0.33

INVENTIVE EXAMPLE IX a. Catalyst Preparation
Organic halide: Secondary butylchloride
Catalyst: 6.0 milligrams titanium carried per gram solid
b. Polymerization
Solid catalyst: 505 milligrams
Polymerization time: 1 hour
Yield: 71 grams white polyethylene, melt index 2.1 and bulk density 0.29

INVENTIVE EXAMPLE X a. Catalyst Preparation
Transition metal compound: Vanadium tetrachloride
Catalyst: 10 milligrams vanadium carried per gram solid
b. Polymerization
Solid catalyst: 520 milligrams
Polymerization time: 0.5 hour
Yield: 108 grams white polyethylene, melt index 0.51 and bulk density 0.32
Polymerization activity: 4,940 grams polyethylene per gram vanadium per hour per ethylene pressure, or 104 grams polyethylene per gram carrier per hour per ethylene pressure

COMPARATIVE EXAMPLE 4 a. Catalyst Preparation
Organic halide: None
Transition metal compound: Vanadium tetrachloride
Catalyst: 1.8 milligrams vanadium carried per gram solid
b. Polymerization
Solid catalyst: 463 milligrams
Polymerization time: 2 hours
Yield: 18 grams polyethylene
Polymerization activity: 2,700 grams polyethylene per gram vanadium per hour per ethylene pressure, or 4.9 grams polyethylene per gram carrier per hour per ethylene pressure

INVENTIVE EXAMPLE XI b. Polymerization
Catalyst: 650 milligrams catalyst obtained in Inventive Example I admixed with 5 millimols diethylzinc
Polymerization time: 1 hour
Yield: 110 grams white polyethylene, melt index 0.91 and bulk density 0.30
Polymerization activity: 2,500 grams polyethylene per gram titanium per hour per ethylene pressure, or 42.4 grams polyethylene per gram carrier per hour per ethylene pressure

INVENTIVE EXAMPLE XII b. Polymerization
Catalyst: 553 milligrams catalyst obtained in Inventive Example I admixed with 5 millimols triethyl aluminum
Solvent: 1,000 milliliters hexane
Hydrogen: 1.5 kg/cm$^2$G
Olefin: Ethylene-propylene gas containing 2 mol% propylene at 70° C
Autoclave pressure: 7 kg/cm$^2$G
Polymerization time: 1 hour
Yield: 141 grams ethylene-propylene copolymer having 4.5 methyl groups per 1,000 carbon atoms; melt index 3.2
Polymerization activity: 3,780 grams polyethylene per gram titanium per hour per ethylene pressure, or 64 grams polyethylene per gram carrier per hour per ethylene pressure

What is claimed is:

1. A process for the production of polyolefins which comprises polymerizing at least one alpha-olefin having 2 to 6 carbon atoms in the presence of a composite catalyst consisting of:
    a. a solid catalyst component resulting from contacting magnesium oxide with an organic halide selected from the group consisting of tertiary butylchloride, tertiary butylbromide, and tertiary hexylchloride, in amounts not exceeding 10 millimols per gram of said magnesium oxide in the presence of solvents inert to Ziegler catalysts at 0° – 200° C, admixing said contacted magnesium oxide with a transition metal halide selected from the group consisting of titanium and vanadium halides in amounts of 0.1 to 50 times by weight of said magnesium oxide that are liquid at the following reaction temperature, and reacting said admixture at 50° – 200° C, and
    b. an organometal compound selected from the group consisting of organoaluminum compounds and alkylzinc compounds.

2. A process as defined in claim 1 wherein said titanium and vanadium halides are selected from the group consisting of titanium tetrachloride, titanium tetrabromide, ethoxy trichlorotitanium, diethoxy dichlorotitanium, dibutoxy dichlorotitanium, vanadium tetrachloride and oxytrichlorovanadium.

3. A process as defined in claim 1 wherein said alpha-olefin is selected from the group consisting of ethylene, propylene, butene-1 and 1-hexene.

4. A process as defined in claim 1 wherein said organic halide is used in amounts of 0.1 to 5 millimols per gram of said magnesium oxide in the presence of solvents inert to Ziegler catalysts.

5. A process as defined in claim 1 wherein said organometal compound is used in amount of 0.1 to 100 mol times said transition metal halide.

6. A process as defined in claim 1 wherein said organic halide is tertiary butylchloride.

7. A process as defined in claim 1 wherein the transition metal halide comprises titanium tetrachloride.

8. A process as defined in claim 1 wherein said organic halide is tertiary butylbromide.

9. A process as defined in claim 1 wherein said organic halide is tertiary hexylchloride.

10. A process for the production of polyolefins which comprises polymerizing at least one alpha-olefin having 2 to 6 carbon atoms in the presence of a composite catalyst consisting of:

a. a solid catalyst component resulting from contacting magnesium oxide with an organic halide selected from the group consisting of tertiary butylchloride, tertiary butylbromide, and tertiary hexylchloride in amounts not exceeding 10 millimols per gram of said magnesium oxide in the presence of solvents inert to Ziegler catalyst at a temperature ranging from 0° C to the boiling point of said organic halide, admixing said contacted magnesium oxide with a transition metal halide selected from the group consisting of titanium and vanadium halides in amounts of 0.1 to 50 times by weight of said magnesium oxide that are liquid at the following reaction temperature, and reacting said admixture at 50° – 200° C, and b. an organometal compound selected from the group consisting of organoaluminum compounds and alkylzinc compounds.

11. A process as defined in claim 10 wherein said organic halide is tertiary butylchloride.

12. A process as defined in claim 10 wherein said organic halide is tertiary butylbromide.

13. A process as defined in claim 10 wherein said organic halide is tertiary hexylchloride.

* * * * *